(12) United States Patent
Hernández Sánchez et al.

(10) Patent No.: US 11,623,490 B2
(45) Date of Patent: Apr. 11, 2023

(54) VIBRATION ATTENUATION ASSEMBLY

(71) Applicant: Nissan North America, Inc., Franklin, TN (US)

(72) Inventors: José Bernardo Hernández Sánchez, Metepec (MX); Jesús Gerardo Brito, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 295 days.

(21) Appl. No.: 16/891,829

(22) Filed: Jun. 3, 2020

(65) Prior Publication Data
US 2021/0379949 A1 Dec. 9, 2021

(51) Int. Cl.
*B60G 15/06* (2006.01)

(52) U.S. Cl.
CPC ...... *B60G 15/067* (2013.01); *B60G 2202/312* (2013.01); *B60G 2204/128* (2013.01); *B60G 2204/45* (2013.01); *B60G 2400/91* (2013.01)

(58) Field of Classification Search
CPC .. B60G 15/067; B60G 15/068; B60G 13/003; B60G 2400/91; B60G 2202/312; B60G 2204/128; B60G 2204/45; B60G 2204/4502; B60G 2204/45021; F16F 2228/04; B62D 25/088
See application file for complete search history.

(56) References Cited

U.S. PATENT DOCUMENTS

| | | | | | |
|---|---|---|---|---|---|
| 4,298,193 | A | * | 11/1981 | Mourray | B60G 15/068 267/220 |
| 4,756,516 | A | * | 7/1988 | Tondato | F16F 9/58 267/153 |
| 5,133,573 | A | * | 7/1992 | Kijima | B60G 15/068 267/33 |
| 5,232,209 | A | * | 8/1993 | de Fontenay | B60G 7/02 267/140.13 |
| 5,261,650 | A | * | 11/1993 | Hein | B60G 15/068 267/153 |
| 5,421,564 | A | * | 6/1995 | Kohlmeier | B60G 13/18 267/293 |
| 5,467,971 | A | * | 11/1995 | Hurtubise | B60G 15/068 280/124.147 |
| 6,076,794 | A | * | 6/2000 | Pradel | F16F 9/58 248/636 |
| 6,123,350 | A | * | 9/2000 | Suzuki | B60G 15/062 280/124.108 |
| 6,352,250 | B1 | | 3/2002 | Tsuruta et al. | |
| 6,382,645 | B1 | * | 5/2002 | Gravelle | B60G 15/068 280/86.752 |

(Continued)

FOREIGN PATENT DOCUMENTS

JP 61205503 A * 9/1986
JP 2003106366 A 4/2003
(Continued)

*Primary Examiner* — Laura Freedman
(74) *Attorney, Agent, or Firm* — Global IP Counselors, LLP

(57) ABSTRACT

A vibration attenuation assembly that includes a strut weight configured to attenuate resonant frequency of a vehicle strut assembly. The strut weight has an upper surface and a lower surface. The strut weight has a rod receiving opening that extends from a central area of the upper surface to the lower surface. The upper surface has a conical shape.

15 Claims, 5 Drawing Sheets

(56) References Cited

U.S. PATENT DOCUMENTS

| | | | | |
|---|---|---|---|---|
| 6,633,089 B2* | 10/2003 | Kimura | ............... | B60R 16/0215 174/72 A |
| 6,776,402 B2* | 8/2004 | Miyamoto | ........... | B60G 13/003 267/140.3 |
| 7,077,248 B2* | 7/2006 | Handke | ............... | B60G 15/068 280/124.147 |
| 7,172,182 B2* | 2/2007 | Huprikar | ............. | B60G 15/067 267/293 |
| 7,347,414 B2* | 3/2008 | Groves | ............... | B60G 15/067 267/33 |
| 7,938,418 B1* | 5/2011 | Coombs | .............. | B60G 15/068 280/124.147 |
| 8,348,029 B2* | 1/2013 | Winocur | ............. | B60G 15/068 267/293 |
| 8,534,649 B2* | 9/2013 | Abe | ...................... | F16F 1/3713 267/33 |
| 8,668,213 B2* | 3/2014 | Takagi | ................ | B60G 13/003 280/124.147 |
| 8,678,361 B2 | 3/2014 | Kim et al. | | |
| 8,813,924 B2* | 8/2014 | Matsumura | .......... | F16F 1/3842 188/321.11 |
| 8,888,081 B2* | 11/2014 | Inoue | ................... | B60G 15/067 188/321.11 |
| 8,894,079 B2* | 11/2014 | Matsumura | .......... | B60G 13/003 280/124.147 |
| 9,010,741 B2* | 4/2015 | Viault | ................... | F16C 33/761 384/617 |
| 9,302,561 B2* | 4/2016 | Itou | ........................... | F16F 9/54 |
| 11,148,500 B2* | 10/2021 | Shim | .................... | B60G 15/063 |
| 2004/0168870 A1* | 9/2004 | Handke | ............... | B60G 15/068 188/321.11 |
| 2005/0247531 A1* | 11/2005 | Oota | ......................... | F16F 9/58 188/322.19 |
| 2007/0144850 A1* | 6/2007 | Hattori | .................... | B60G 3/06 188/322.16 |
| 2009/0085266 A1* | 4/2009 | Kim | ...................... | B60G 15/068 267/195 |
| 2020/0269646 A1* | 8/2020 | Otsu | .................... | B60G 15/068 |

FOREIGN PATENT DOCUMENTS

| | | | |
|---|---|---|---|
| JP | 2007010005 A | * | 1/2007 |
| JP | 2009243503 A | * | 10/2009 |
| JP | 2013194797 A | * | 9/2013 |
| JP | 2014074481 A | * | 4/2014 |

* cited by examiner

VIBRATION ATTENUATION ASSEMBLY

BACKGROUND

Field of the Invention

The present invention generally relates to a vibration attenuation assembly for a vehicle. More specifically, the present invention relates to vibration attenuation assembly that includes a strut weight attached to an upper end of a vehicle strut assembly.

Background Information

All structures have one or more resonance resonant frequencies. A resonance resonant frequency is a natural frequency of vibration present in any object or structure.

SUMMARY

One object of the present disclosure is to provide a vehicle body structure with a simple means for attenuation of a structure to reduce or eliminate vibrations of that structure.

Another object of the present disclosure is to provide a vehicle strut assembly with a weight that attenuates the natural vibration frequencies of the vehicle strut assembly.

In view of the state of the known technology, one aspect of the present disclosure is to provide a vibration attenuation assembly with a strut weight configured to attenuate resonant frequency of a vehicle strut assembly. The strut weight has an upper surface and a lower surface. The strut weight has a rod receiving opening that extends from a central area of the upper surface to the lower surface. The upper surface has a conical shape.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
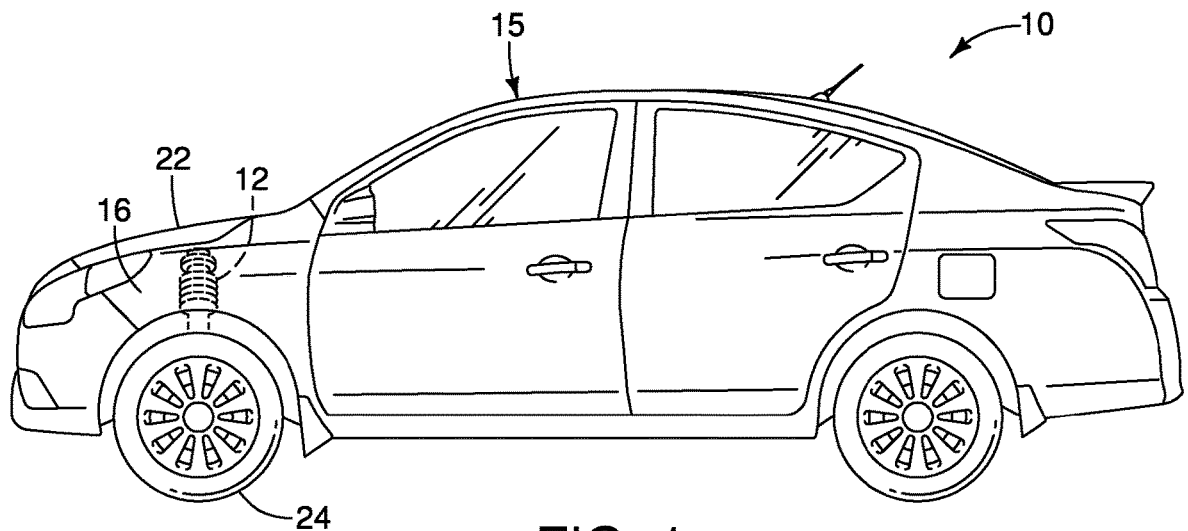
FIG. 1 is a side view of a vehicle that includes a vehicle body structure with a strut assembly in accordance with an exemplary embodiment.

Referring initially to FIG. 1, a vehicle 10 that includes a strut assembly 12 that at least partially defines a vibration attenuation assembly 14 (FIG. 5) is illustrated in accordance with a first embodiment.

Figure 2:
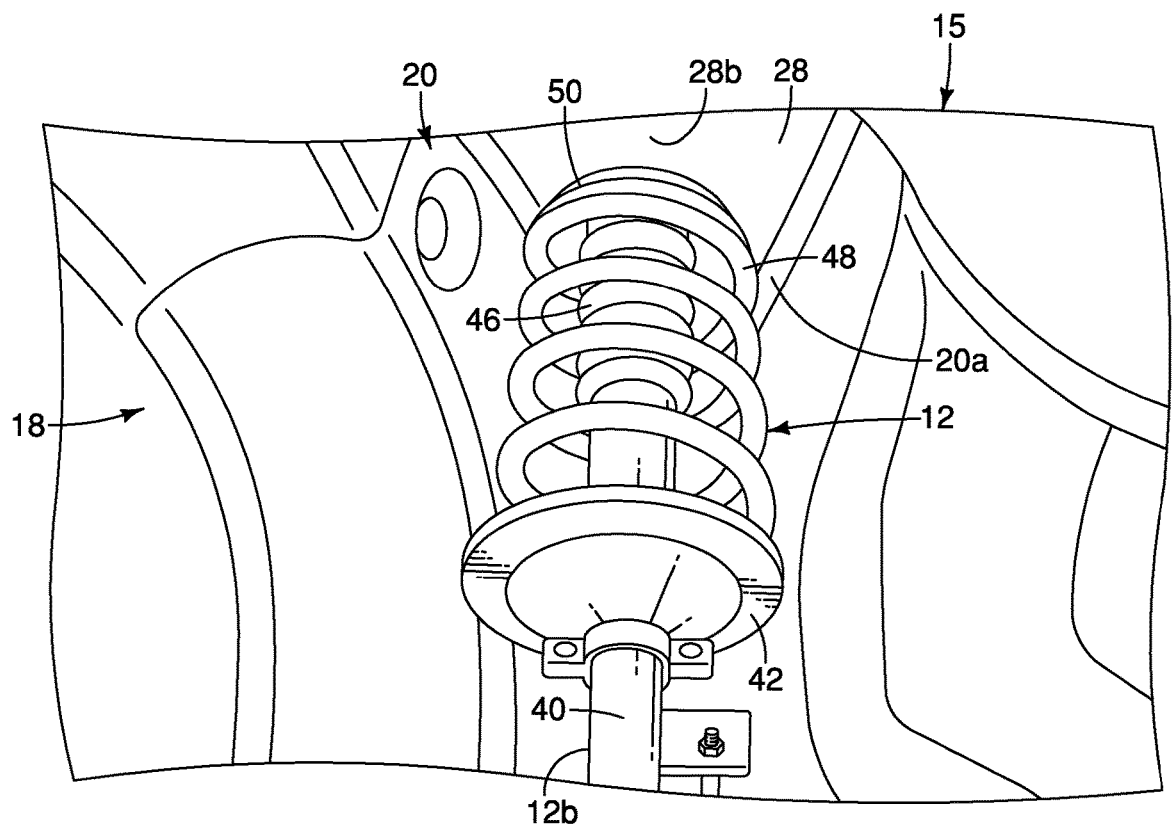
FIG. 2 is a perspective view of a front wheel well of the vehicle body structure with the wheel removed showing a strut tower of the vehicle body structure and a strut assembly installed within a concaved area defined by the strut tower in accordance with the exemplary embodiment.

The vehicle 10 further includes a vehicle body structure 15 that includes a front fender 16 that partially conceals a wheel well 18. As shown in FIG. 2, the vehicle body structure 15 further includes a structure that defines a strut tower 20 with outer surfaces exposed to the wheel well 18. The strut tower 20 is constructed with a plurality of panels welded together to define a concaved area 20a that is located outboard of an engine compartment 22 of the vehicle body structure 15. The strut assembly 12 is disposed within a concaved area 20a of the strut tower 20. The strut tower 20 includes an upper panel that is herein hereinafter referred to as the strut attachment structure 28.

Figure 3:
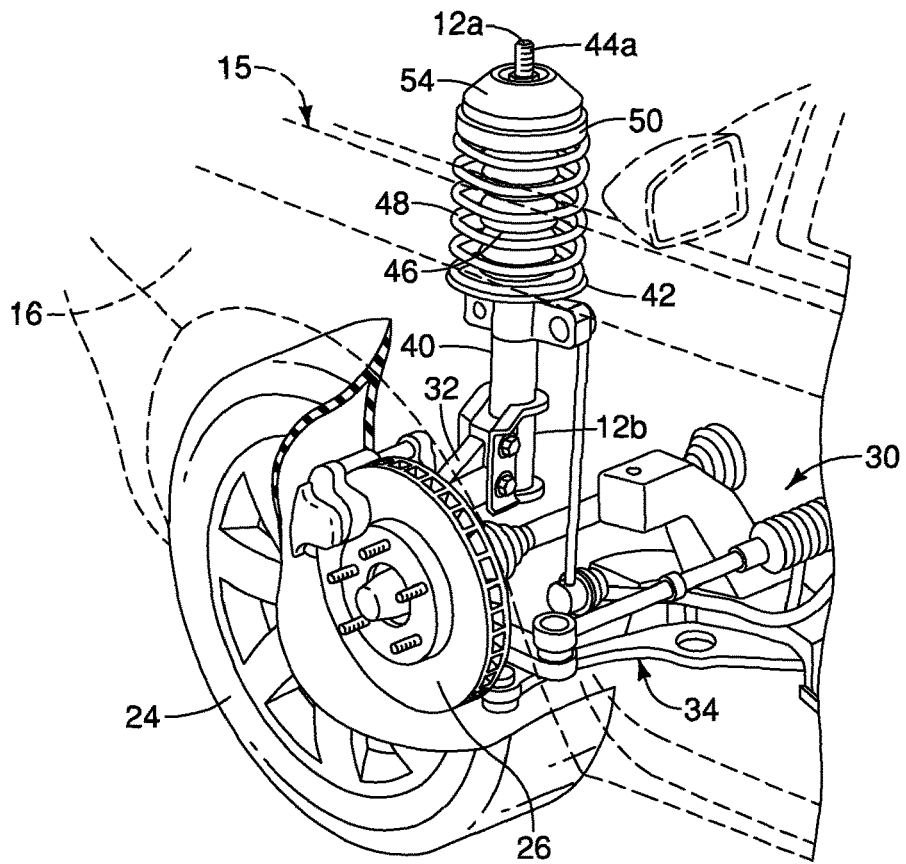
FIG. 3 is a part cut-away perspective view showing a portion of the suspension system and steering assembly of the vehicle depicted in FIGS. 1 and 2, showing the strut assembly in accordance with the exemplary embodiment.

As shown in FIG. 3 a front wheel 24 is attached to a brake rotor 26 that is supported by the strut assembly 12 in a conventional manner. As shown in FIG. 2 with the front wheel 24 removed, an upper end 12a of the strut assembly 12 is fixed to the strut attachment structure 28 (the upper panel of the strut tower 20), as is described in greater detail below.

Figures 5, 6:
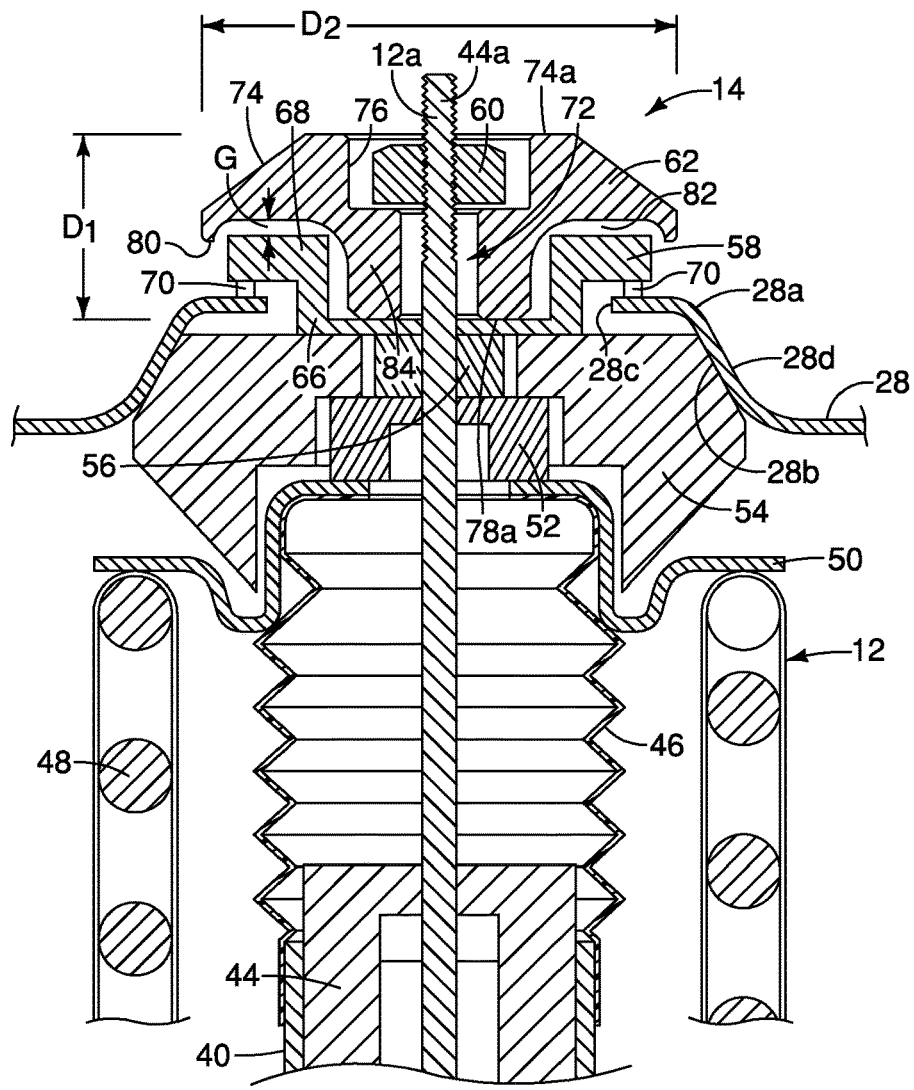
FIG. 5 is a cross-sectional view of the strut assembly and top panel of the strut tower taken along the lines 5-5 in FIG. 4, showing the various features of the strut assembly and the strut weight in accordance with the exemplary embodiment.
FIG. 6 is another perspective view of the upper end of the strut assembly, the top panel of the strut tower and the strut weight in accordance with the exemplary embodiment.
Figure 7:
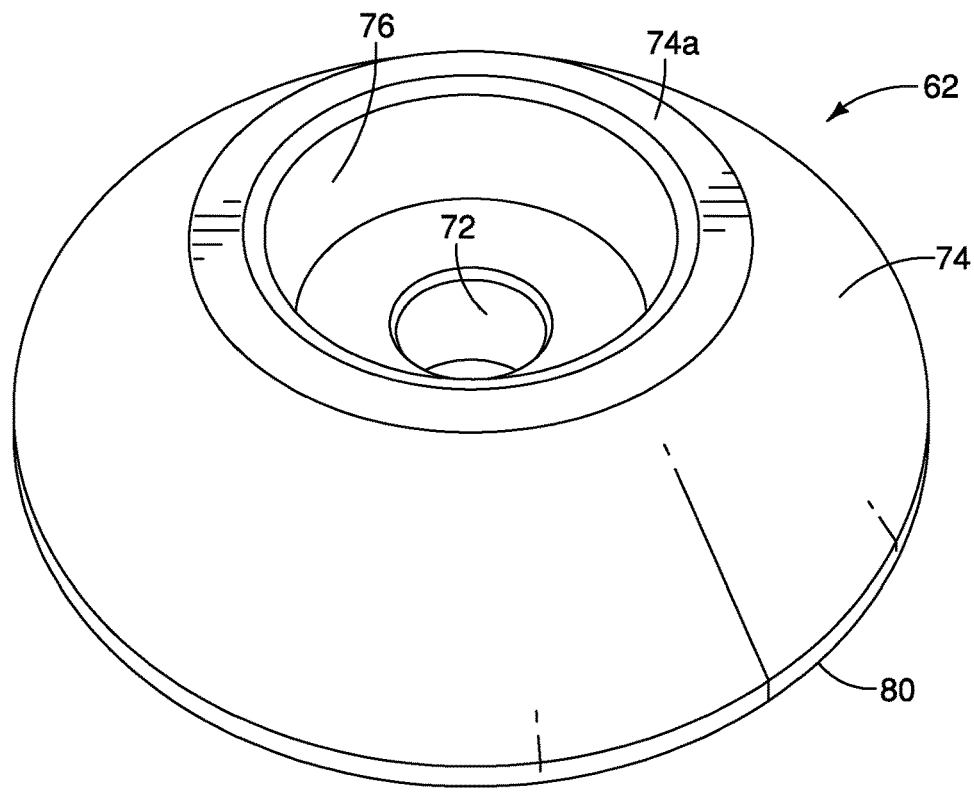
FIG. 7 is a top perspective view of the strut weight removed from the strut assembly in accordance with the exemplary embodiment.

As shown in FIG. 5, the strut attachment structure 28 includes an upper surface 28a and a lower surface 28b (FIGS. 2 and 5), with a single opening 28c extending from the lower surface 28b to the upper surface 28a.

As shown schematically in FIG. 3, the strut assembly 12 is part of the suspension system 30 of the vehicle 10. In the depicted embodiment, the strut assembly 12 is installed to a front section of the vehicle body structure 15. A lower end 12b of the strut assembly 12 is connected to a steering knuckle 32 of a steering assembly 34 of the vehicle 10. However, it should be understood from the drawings and the description herein that the strut assembly 12 can alternatively be installed to a rear section of the vehicle 10 as part of a rear suspension system of the vehicle 10. Since vehicle suspension systems and steering systems are conventional vehicle structures and components, further description is omitted for the sake of brevity.

Figure 4:
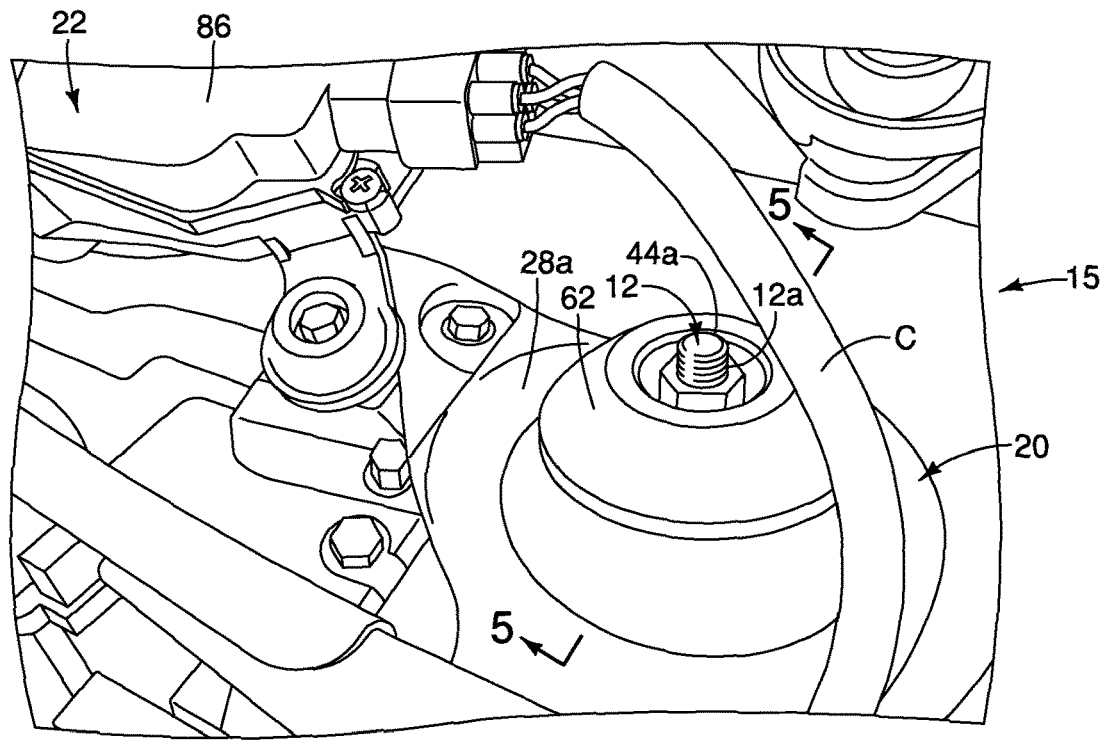
FIG. 4 is a perspective view of a portion of the engine compartment of the vehicle depicted in FIG. 1, showing a cowl area of the engine compartment and a top panel of the strut tower with an upper end the strut assembly attached thereto in accordance with the exemplary embodiment.

A description of the strut assembly 12 is now provided with specific reference to FIGS. 4 and 5. The strut assembly 12 basically includes a hollow support member 40, a lower spring seat 42, a shock absorber 44, a flexible bumper boot 46, a coil spring 48, an upper spring seat 50, a strut bearing 52, an insulator strut mounting 54, a sleeve 56, an upper insulator stopper 58 (also referred to as a rebound stopper 58), a strut attachment fastener 60 and a strut weight 62.

The hollow support member 40 defines the lower end 12b of the strut assembly 12 and is attached to the steering knuckle 32, as mentioned above. The lower spring seat 42 is welded to or otherwise fixedly attached to the hollow support member 40. A lower end of the shock absorber 44 is fitted within the hollow support member 40 and is attached thereto. The shock absorber 44 has a shaft 44a that moves relative to the hollow support member 40 in response to the vehicle 10 rolling over uneven surfaces in a conventional manner. The upper end of the shaft 44a extends upward through respective openings in the flexible bumper boot 46, the upper spring seat 50, the strut bearing 52, the insulator strut mounting 54, the sleeve 56, the strut attachment structure 28, the upper insulator stopper 58, the strut attachment fastener 60 and the strut weight 62.

The flexible bumper boot 46 has a lower end that attaches to an outer surface of an upper end of the hollow support member 40. The flexible bumper boot 46 has an upper stopper end that is retained within the upper spring seat 50. The coil spring 48 is installed between the lower spring seat 42 and the upper spring seat 50.

The insulator strut mounting 54 is basically a lower insulator stopper that can be manufactured with a metallic support surrounded by a compressible elastic material, or alternatively can be made completely from a compressible elastic material.

The upper insulator stopper 58 includes a metallic cup shaped portion 66 and an outer annular ring portion 68 that includes elastic cushion elements 70. The metallic cup shaped portion 66 extends through the single opening 28c of the strut attachment structure 28 and overlays and contacts the sleeve 56. The metallic cup shaped portion 66 also contacts a portion of the insulator strut mounting 54. The outer annular ring portion 68 extends radially outward over the upper surface 28a of the strut attachment structure 28. The elastic cushion elements 70 contact the upper surface 28a of the strut attachment structure 28. Hence, the strut attachment structure 28 is clamped between the upper insulator stopper 58 and the insulator strut mounting 54 (the lower insulator stopper).

The sleeve 56 overlays and contacts a portion of the strut bearing 52. The bearing overlays and contacts a portion of the upper spring seat 50.

A description of the strut weight 62 is now provided with reference to FIGS. 5-10. The strut weight 62 is made of a heavy material such as cast iron, steel or any of a variety of alloys. In other words, the strut weight 62 is designed and configured to be heavy with a pre-determined mass (weight).

The strut weight 62 has an annular disc-like shape with a central opening 72, an upper surface 74 with a counterbore 76 axially aligned with the opening 72 and a lower surface 78 of the strut weight 62. The upper surface 74 has an uppermost annular surface portion 74a, with the remainder of the upper surface 74 having a conical shape tapering that extends from a radial outward edge of the uppermost annular surface portion 74a downward moving towards an outer radial edge thereof. The opening 72 extends from the upper surface 74 to the lower surface 78. The counter bore 76 extends approximately half-way down the opening 72 and is axially aligned with the opening 72. The counter bore 76 is dimensioned to receive the strut attachment fastener 60.

Figure 8:
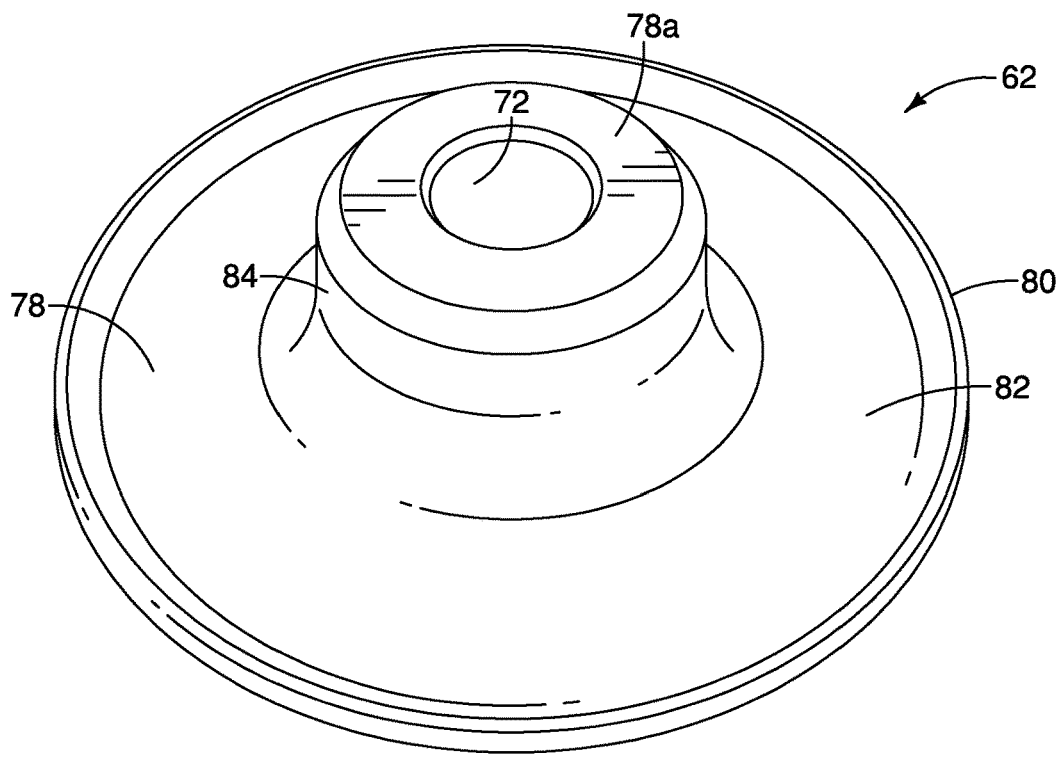
FIG. 8 is a bottom perspective view of the strut weight removed from the strut assembly in accordance with the exemplary embodiment.
Figure 9:
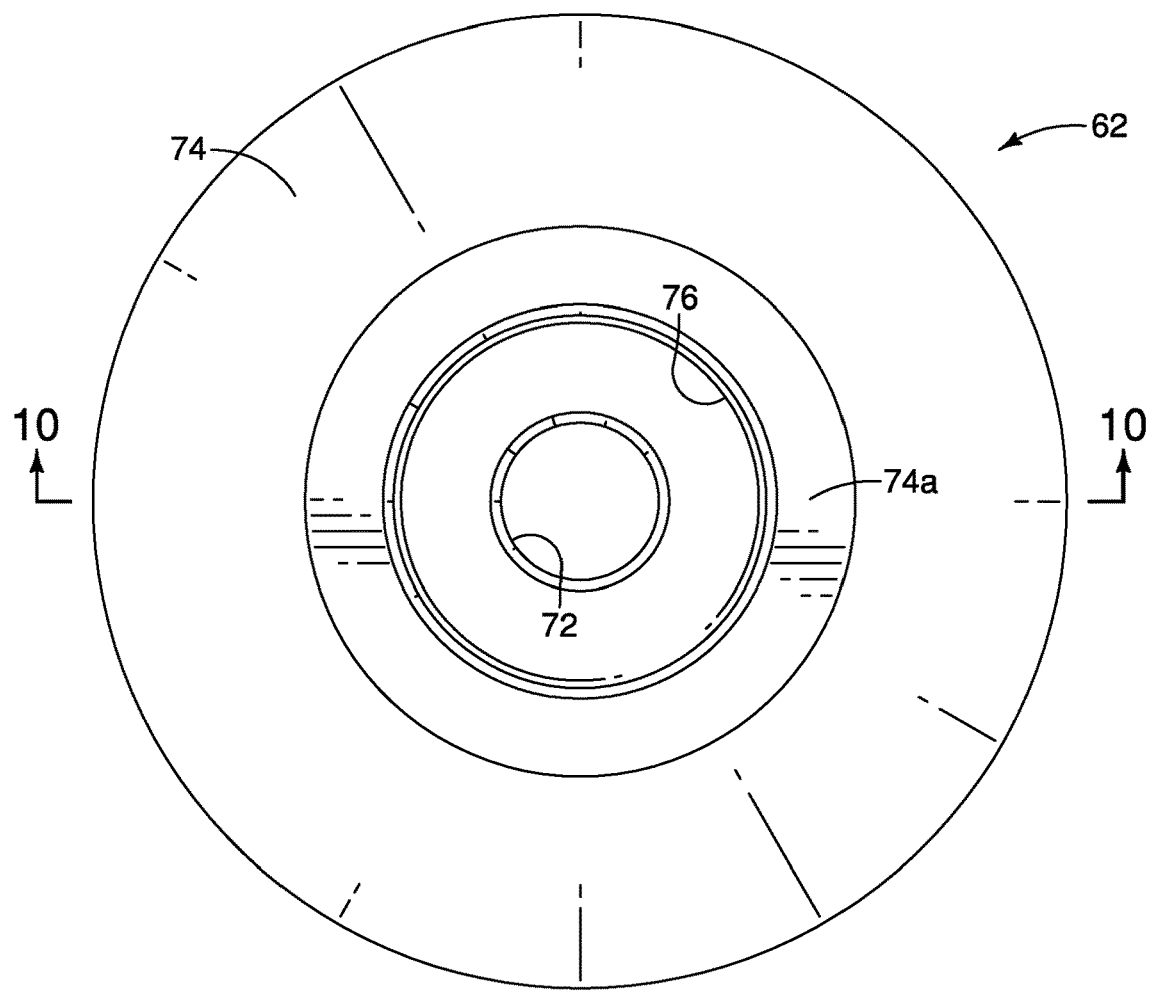
FIG. 9 is a top view of the strut weight in accordance with the exemplary embodiment.
Figure 10:
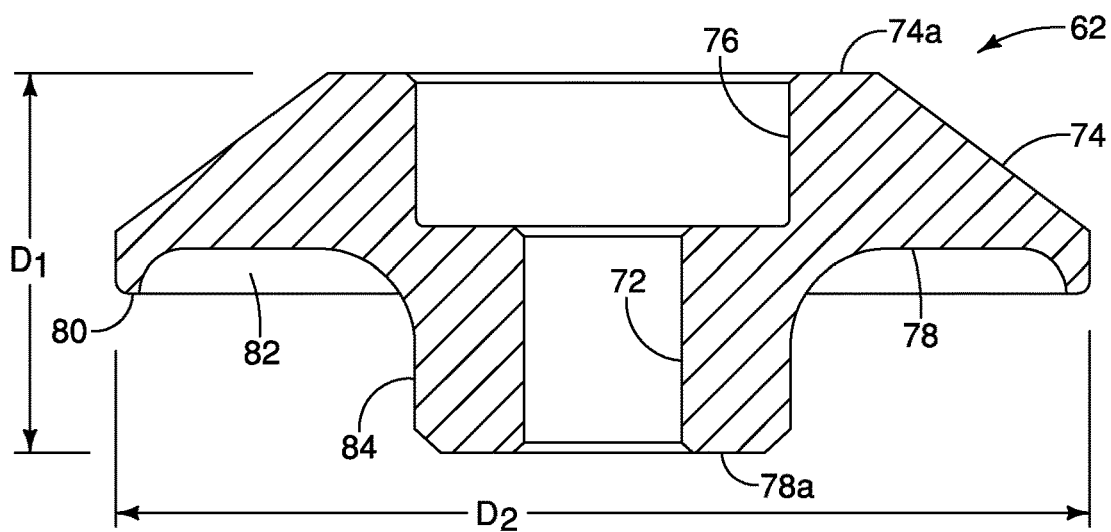
FIG. 10 is a cross-sectional view of the strut weight taken along the line 10-10 in FIG. 9 in accordance with the exemplary embodiment.

As shown in FIGS. 5, 8 and 10, the lower surface 78 includes an outer annular ring 80 or projection that extends downward from the remainder of the lower surface 78. The outer annular ring 80 encircles a concaved area 82. A central portion 84 extends downward from a central area of the lower surface 78 and serves as a hub with the opening 72 extending therethrough. The central portion 84 of the strut weight 62 has a cylindrical shape. Further, the lower surface 78 includes a lowermost surface portion 78a defined along the bottom of the central portion 84. The concaved area 82 of the lower surface 78 is defined between the central portion 84 and the outer annular ring 80. The strut weight 62 defines a height or first distance $D_1$ as measured from the uppermost annular surface portion 74a to the lowermost surface portion 78a. Further, an outermost diameter of the strut weight 62 defines a second distance D2 that is greater than the first distance $D_1$, as shown in FIGS. 5 and 10.

The strut attachment fastener 60 is basically a threaded nut that is configured and dimensioned to thread onto threads formed along the upper end of the shaft 44a of the shock absorber 44. Once tightened, the strut attachment fastener 60 is disposed within the counterbore 76 of the strut weight 62. Further, once tightened, the strut attachment fastener 60 presses the central portion 84 of the strut weight 62 against the metallic cup shaped portion 66 of the upper insulator stopper 58. The tightening force of the strut attachment fastener 60 further presses the metal cup shaped portion 66 against the upper surfaces of the insulator strut mounting 54 and the sleeve 56. Hence, vertical movement of the upper end 12a of the strut assembly 12 is limited by the strut attachment structure 28 (upper panel of strut tower 20) being clamped between the insulator strut mounting 54 (the lower rebound stopper 54) and the upper insulator stopper 58 (the rebound stopper 58).

As shown in FIGS. 4-6, the upper end 12a of the strut assembly 12 extends through the opening 28a in the strut attachment structure 28 and terminates within the engine compartment 22 of the vehicle 10. The design of the vehicle 10 is such that the upper end 12a of the strut assembly 12 is located in the cowl area of the vehicle body structure 15 adjacent to a windshield wiper motor 86. Power to the windshield wiper motor 86 is provided via a cable C, as shown in FIG. 4. An advantage of the conical shape of the upper surface 74 is that the cable C can be easily installed to overlay the upper surface of the strut weight 62, without crowding the space beneath the hood of the engine compartment 22.

A section of the upper insulator stopper 58 is at least partially disposed within the concaved area 82 of the lower surface 78 of the strut weight 62, as shown in FIG. 5. However, with the vehicle 10 parked and/or in normal operating conditions a gap G is defined between an upper surface of the upper insulator stopper 58 and the lower surface 78 of the strut weight 62. Further, the outer diameter of the upper surface of the upper insulator stopper 58 is smaller than the diameter of the outer annular ring 80 of the lower surface 78 of the strut weight 62. Consequently, the upper insulator stopper 58 is not in contact with the outer annular ring 80 during normal operating conditions. The gap G is provided such that a portion (the upper surface) of the upper insulator stopper 58 can flex when, for example, going over a bump or a pothole in the road. The upper insulator stopper 58 can be moved upward in response to going over a bump or a pothole and move toward the lower surface 78 of the strut weight 62 thereby reducing the overall size of the gap G in response to strut rebound movement. It should be understood from the drawings and the description herein that the elastic and compressible properties of the upper insulator stopper 58 and the insulator strut mounting 54 are designed to undergo small amounts of compression and elastic movement to reduce or eliminate transmission of vibrations from the strut assembly 12 to the vehicle body structure 15.

A description of the vibration attenuation assembly 14 is now provided. As shown in FIGS. 3-6, the strut assembly 12 employs the shaft 44a (a single rod) of the shock absorber 44 to fix the strut assembly 12 to the strut attachment structure 28 via the strut attachment fastener 60. Prior strut assembly designs typically include multiple attachment points with a corresponding number of fasteners. Since the strut assembly 12 attaches to the strut attachment structure 28 of the strut tower 20 of the vehicle body structure 15, it is possible to employ the strut weight 62 to accomplish vibration attenuation of the strut assembly 12 relative to the strut tower 20 and the vehicle body structure 15. The vibration attenuation assembly 14 includes the strut weight 62 and the strut assembly 12, since the strut weight 62 is employed to change resonance frequencies of the strut assembly 12.

In accordance with the principles of basic physics and basic engineering principles, all structures have resonant frequencies. Specifically, if a structure is exposed to a vibration at the resonant frequency of the structure, the structure will also vibrate and can amplify that vibration due to mechanical resonance.

Mechanical resonance is the tendency of a mechanical system to absorb more energy when the frequency of its oscillations matches the system's natural frequency of vibration (resonant frequency) than it does at other frequencies. It is advantageous to design structures to ensure the mechanical resonant frequencies of vehicle component parts do not match driving vibrational frequencies of motors or other oscillating parts of the vehicle in order to improve the vehicle operating experience and avoid premature failure.

Each portion of the vehicle body structure 15, including the strut attachment structure 18 has at least one resonant frequency and can have multiple resonant frequencies. Specifically, the strut tower 20 (including the strut attachment structure 28) of the vehicle body structure 15 defines at least a first resonant frequency. The strut assembly 12 defines a second resonant frequency. Depending on the design of the vehicle 10, the first resonant frequency of the strut tower 20 can be close to or the same as the second resonant frequency of the strut assembly 12 (in the absence of the strut weight).

When installed to the strut assembly 12 in a manner described above, the strut weight 62 changes the second resonant frequency of the strut assembly 12 to a different resonant frequency, in order to ensure that the new resonant frequency of the strut assembly 12 with the strut weight 62 differs from the first resonant frequency of the strut attachment structure 28 (and possibly the vehicle body structure 15). The strut weight 62 can be configured with a predetermined mass that changes and attenuates the second resonant frequency of the strut assembly 12 in order to prevent propagation of mechanical vibrations in the strut tower 20 and the strut assembly 12 when operating the vehicle 10.

Hence, the strut weight 62 is configured to attenuate resonant frequency of the strut assembly 12 when installed to the upper portion 12a of the strut assembly 12.

The various features of the vehicle 10, other than the vibration attenuation assembly 14 (and strut weight 62) are conventional components that are well known in the art. Since these features of the vehicle 10 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above". "downward", "vertical", "horizontal", "below" and "transverse" as well as any other similar directional terms refer to those directions of a vehicle equipped with the vibration attenuation assembly. Accordingly, these terms, as utilized to describe the present invention should be interpreted relative to a vehicle equipped with the vibration attenuation assembly.

The term "configured" as used herein to describe a component, section or part of a device includes hardware and/or structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vibration attenuation assembly, comprising:
a vehicle body structure that includes a strut attachment structure with an upper surface and a lower surface, with a single opening extending from the lower surface to the upper surface;
a strut assembly substantially installed below the lower surface of the strut attachment structure, the strut assembly having a single rod with an upper end that extends through the single opening in the strut attachment structure to a predetermined location above the upper surface of the strut attachment structure, the strut assembly including an insulator stopper;
a strut weight overlaying a portion of the upper surface of the strut attachment structure and having a rod receiving opening with a section of the upper end of the rod extending therethrough, the insulator stopper being installed between the upper surface of the strut attachment structure and a lower surface of the strut weight with a gap being defined between an upper surface of the insulator stopper and the lower surface of the strut weight, the gap being provided such that a portion of the insulator stopper flexes toward the lower surface of the strut weight reducing the gap in response to strut rebound movement; and a strut attachment fastener installed to the upper end of the rod retaining the strut assembly to the strut attachment structure and retaining the strut weight to the rod.

2. The vibration attenuation assembly according to claim 1, wherein the strut attachment structure of the vehicle body structure defines a first resonant frequency and the strut assembly defines a second resonant frequency, the first resonant frequency being close to or the same as the second resonant frequency in the absence of the strut weight, and the strut weight having a predetermined mass that changes and attenuates the second resonant frequency of the strut assembly in order to prevent propagation of mechanical vibrations between the strut attachment structure and the strut assembly.

3. The vibration attenuation assembly according to claim 1, wherein the strut attachment structure is at least partially defined by an upper area of a strut tower structure of the vehicle body structure.

4. The vibration attenuation assembly according to claim 1, wherein the strut weight has an upper surface and the lower surface with the rod receiving opening extending from a center of the lower surface of the strut weight to a center of the upper surface of the strut weight.

5. The vibration attenuation assembly according to claim 4, wherein the upper surface of the strut weight has a counterbore axially aligned with the rod receiving opening with the strut attachment fastener being at least partially disposed within the counterbore.

6. The vibration attenuation assembly according to claim 4, wherein the upper surface of the strut weight has a conical shape.

7. The vibration attenuation assembly according to claim 6, wherein the lower surface of the strut weight defines a concaved area.

8. The vibration attenuation assembly according to claim 1, wherein the insulator stopper is at least partially disposed within a concaved area of the lower surface of the strut weight.

9. A vibration attenuation assembly, comprising:

a vehicle body structure that includes a strut attachment structure with an upper surface and a lower surface, with a single opening extending from the lower surface to the upper surface;

a strut assembly substantially installed below the lower surface of the strut attachment structure, the strut assembly having a single rod with an upper end that extends through the single opening in the strut attachment structure to a predetermined location above the upper surface of the strut attachment structure;

a strut weight overlaying a portion of the upper surface of the strut attachment structure and having a rod receiving opening with a section of the upper end of the rod extending therethrough, the strut weight being configured to attenuate a resonant frequency of the strut assembly, the strut weight having an upper portion and a central portion, the upper portion having an upper surface and the central portion having a lower surface, a rod receiving opening extending from a central area of the upper surface of the strut weight to the lower surface of the strut weight, an outer radial portion of the upper surface of the strut weight having a conical shape, the central portion of the strut weight extending downward from the upper portion and having a cylindrical shape; and a strut attachment fastener installed to the upper end of the rod retaining the strut assembly to the strut attachment structure and retaining the strut weight to the rod.

10. The vibration attenuation assembly according to claim 9, wherein the upper surface of the strut weight has a cylindrically shaped counterbore axially aligned with the rod receiving opening, the counterbore being dimensioned such that the strut attachment fastener fastened to the single rod is located in its entirety below a topmost surface of the upper surface of the strut weight.

11. The vibration attenuation assembly according to claim 10, wherein the strut assembly includes an insulator stopper that is installed between the upper surface of the strut attachment structure and the lower surface of the strut weight.

12. The vibration attenuation assembly according to claim 11, wherein a gap is defined between an upper surface of the insulator stopper and the lower surface of the strut weight, the gap being provided such that a portion of the insulator stopper flexes toward the lower surface of the strut weight reducing the gap in response to strut rebound movement.

13. The vibration attenuation assembly according to claim 9, wherein a mid-portion of the lower surface of the strut weight is located vertically below a topmost portion of the upper surface of the strut weight.

14. The vibration attenuation assembly according to claim 9, wherein the strut attachment structure of the vehicle body structure defines a first resonant frequency and the strut assembly defines a second resonant frequency, the first resonant frequency being close to or the same as the resonant frequency in the absence of the strut weight, and the strut weight having a predetermined mass that changes and attenuates the second resonant frequency of the strut assembly in order to prevent mechanical vibrations from being generated between the strut attachment structure and the strut assembly.

15. The vibration attenuation assembly according to claim 9, wherein a topmost section of the upper surface of the strut weight and a lowermost section of a lowermost surface of the central portion defines a first distance and an outermost diameter of the strut weight defines a second distance that is greater than the first distance.

* * * * *